No. 888,944. PATENTED MAY 26, 1908.
R. W. & C. B. VARDEMAN.
COUNTER.
APPLICATION FILED SEPT. 30, 1907.
2 SHEETS—SHEET 1.
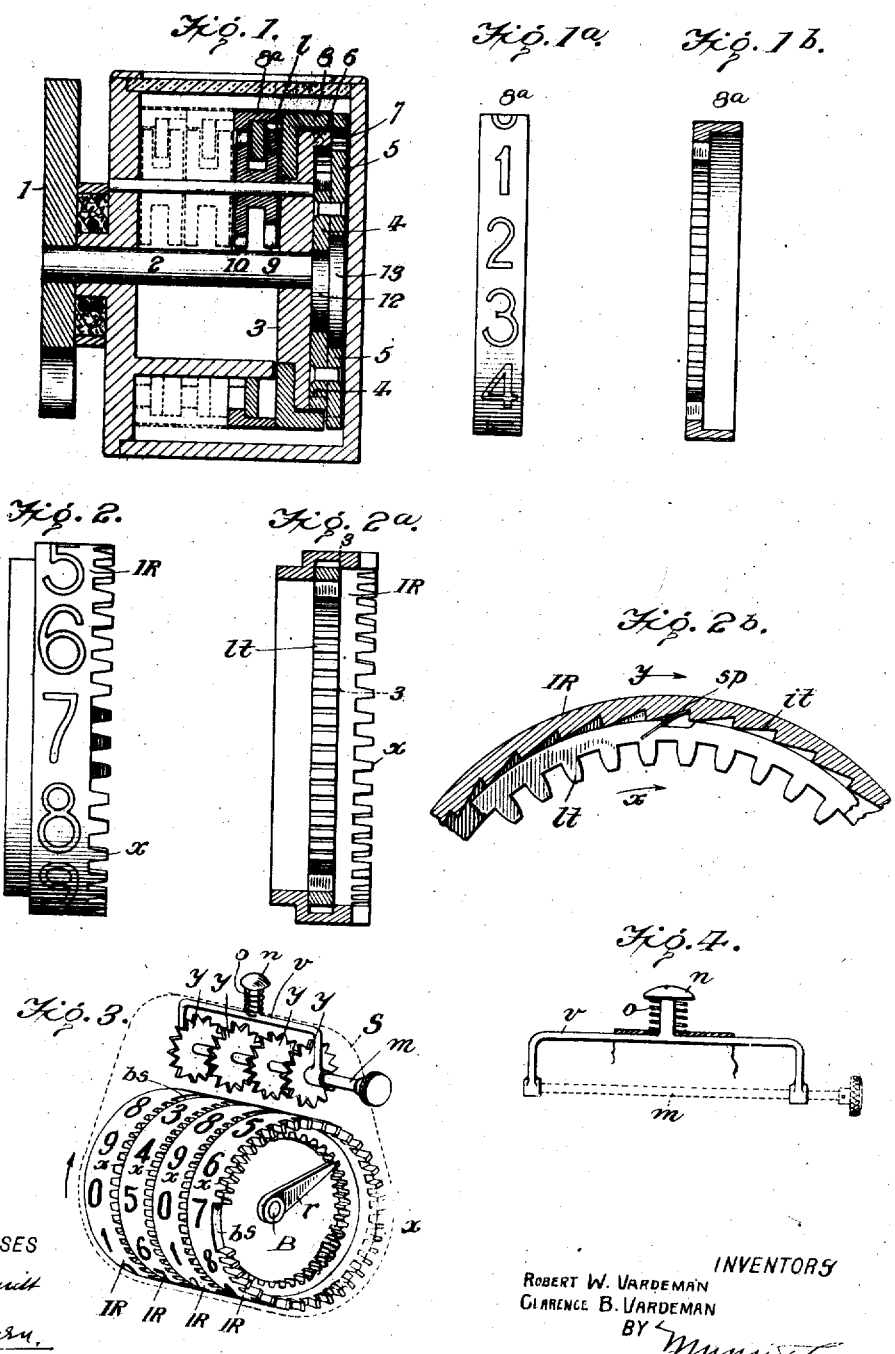
WITNESSES
J. H. Schmitt
Edw. W. Byrn
INVENTORS
ROBERT W. VARDEMAN
CLARENCE B. VARDEMAN
BY Munn & Co.
ATTORNEYS

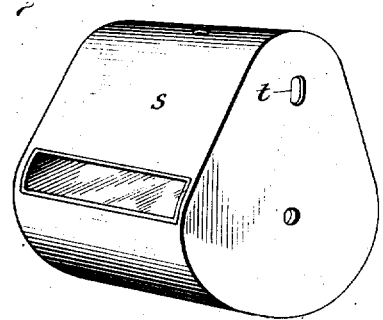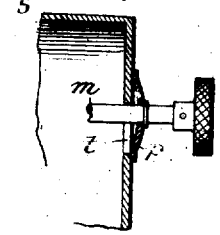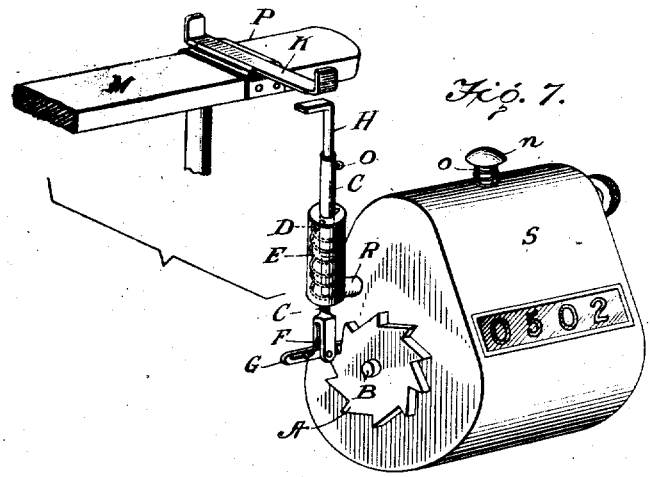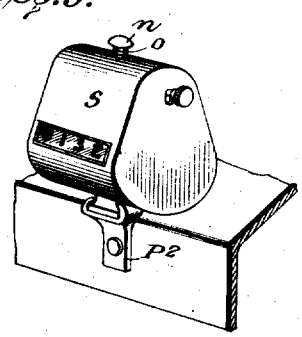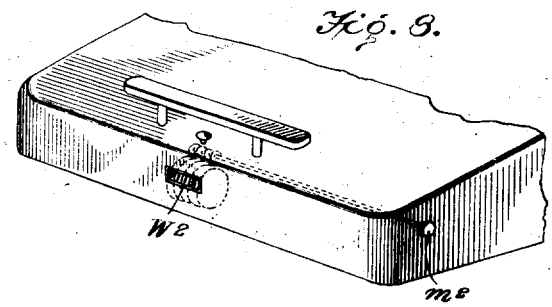

UNITED STATES PATENT OFFICE.

ROBERT W. VARDEMAN AND CLARENCE B. VARDEMAN, OF MARSHALL, MISSOURI.

COUNTER.

No. 888,944.   Specification of Letters Patent.   Patented May 26, 1908.

Application filed September 30, 1907. Serial No. 395,056.

*To all whom it may concern:*

Be it known that we, ROBERT W. VARDEMAN and CLARENCE B. VARDEMAN, citizens of the United States, and residents of Marshall, in the county of Saline and State of Missouri, have invented an Improvement in Counters, of which the following is a specification.

Our invention relates generally to that class of machines called counters or registers, and particularly to the machines of this class that are known as cyclometers, such devices being adapted for the purpose of measuring the distance traveled by wheeled vehicles. It is also applicable to machines known as logometers, or word counters, which are adapted to the purpose of counting words automatically as they may be written on the typewriter, or on a type setting machine. The invention may be also found useful for other applications as registers or counters. Our invention consists mainly in the means for restoring the index rings to zero, conveniently and quickly, and also in means for adapting it to application for the several uses described.

Figure 1 is a longitudinal section taken through a cyclometer of the form already known, and to which our invention is especially applicable. Fig. 1$^a$ is a face view in detail of one of the index rings of said cyclometer. Fig. 1$^b$ is a section through the same. Fig. 2 is a face view of one of our index rings, and Fig. 2$^a$ a sectional view of the same showing our improvement. Fig. 2$^b$ is an enlarged detail section on line 3—3 of Fig. 2$^a$. Fig. 3 is a perspective view of the cyclometer equipped with our invention, the containing case being removed. Figs. 4, 5 and 6 are details of the same. Fig. 7 is a perspective view showing the application of our invention to the space bar of a typewriter for use as a logometer or word counter. Fig. 8 shows a perspective view of the space bar of a typewriter having our logometer incorporated in the frame thereof; and Fig. 9 is a perspective view showing our logometer applied to a typewriter as an external attachment thereto.

In order to more clearly present the distinctive features of our invention, it will be necessary to first briefly describe the construction and arrangement of one of the old forms of cyclometers to which it is applicable. This we have shown in Figs. 1, 1$^a$ and 1$^b$. This device is a cyclometer of the type shown and described in the patent to Veeder, No. 548,482, October 22, 1895.

A star wheel 1 is intermittently moved by a tappet projection from the wheel of the bicycle and turns the axial shaft 2. This shaft rotates in bearings in a stationary partition disk 3, and carries on its end two cams disks 12 and 13 of different diameters. These cam disks swivel within two gear wheels 4 and 5, the gear wheel 4 being in the plane of the cam 12, and the gear wheel 5 in the plane of the cam 13. The gear wheel 4 rotates in mesh with a stationary set of teeth 6 fixed to the partition disk 3. The gear wheel 5, which is of larger diameter, rotates in mesh with the inwardly projecting teeth 7 of an index ring 8. The gear wheels 4 and 5 are rigidly connected together, and by a differential effect transmit from the traverse of the stationary teeth 6, a very slow movement to the teeth 7 of the index ring 8. The index ring 8 transmits by a decimal reduction its motion to its adjacent index ring 8$^a$ of next higher denomination, in the usual way of carrying from a lower denomination to a higher denomination in counting machines. The means here employed consist of a pair of wheels 9 and 10 rigidly connected to a hub 11 rotating on a different axis from the index rings. The wheel 9 is struck once and turned one notch for every complete revolution of the index ring 8, by a lug $l$, and through its attached gear wheel 10, rotates the second index ring 8$^a$ one notch, in carrying from the lower to the higher denomination.

In the form of device described, it is impossible to set the registration back to zero without the same slow process that was used in going forward. Our invention provides a device to set the cyclometer back to zero instantly, from any registration, by the simple turning of a handle knob.

By referring to Fig. 1$^b$, it will be seen that each of the index rings 8$^a$ is provided with inwardly projecting teeth which are engaged by their actuating gears 10, and as these teeth are made integral with said index ring, and are constantly in mesh with the actuating pinions 10, Fig. 1, it is impossible to disassociate or dissolve the relation between the actuating gears and the index rings, and in order to set these index rings to zero, it is necessary to operate the actuating gears as well.

In Figs. 2, 2ª and 2ᵇ, we have shown the construction of the index ring and its accessories, which permit the relation between the index ring and its actuating gears to be dissolved at will, in an instant, and the index ring restored to its zero position, without affecting the forward or progressively counting movement of said ring when in normal operation. For this purpose, the index ring I R and its actuating gear teeth l t are made as two separable and independently movable members; the ring of gear teeth l t, Fig. 2ª, is made to swivel freely within the index ring I R in one direction, and in the other direction for normal counting moves rigidly with and actuates said index ring. In bringing this about, the interior of the index ring I R—see Fig. 2ᵇ—is formed with a small series of inwardly projecting ratchet teeth i t, and the loose toothed ring l t is provided on its outer periphery with a thin and flexible spring pawl s p. When the loose ring l t is being turned by its actuating gears in the direction of the arrow x, its spring pawl s p also engages the teeth i t of the index ring I R, and also actuates said index ring I R in the direction of the arrow y for normal and progressive counting. For quickly setting the index ring to zero again, it is only necessary to continue the rotation of the same in the direction of the arrow y, and the spring pawl s p in such case allows the index ring I R to freely turn independently of the connection of the toothed ring l t with its rigidly connected actuating gears. There is formed on one side of each index ring a shoulder adapted to fit in the adjacent index ring sufficient to hold the loose toothed ring l t in position, as seen in Fig. 2ª.

We will now describe the means whereby the operator is enabled to freely and easily move the periphery of each index ring to such position that the reading will be zero, reference being had to Fig. 3 of the drawing. The peripheral face of each index ring will be made sufficiently wide to permit the placing of the figures on the outside, and also leave a small space on the side for cog teeth x, which extend around the periphery of each index ring, except at one point, where there will be no cogs, but will be a blank space, the purpose for which blank space will presently appear.

The cylindrical portion of the case is extended on one side at s forming an eccentric housing. In each end of this eccentric housing is formed a slot t, Fig. 5, through which extends a shaft m having an external knob handle and bearing a series of toothed wheels y rigidly attached to said shaft. Each of these wheels occupies a position in the plane of the teeth x of the index ring, but is normally out of contact with the same. A yoke shaped frame v is provided with bearings which receive the shaft m. This yoke shaped frame has near the middle attached to it a push button n whose shank passes through an opening in the eccentric housing s and is normally held up by a subjacent spring o. The tension of this spring holds the shaft m up in the elevated position in the slots t so that its wheels y are entirely out of gear with the teeth x of the index rings, and therefore do not retard or obstruct the normal rotation of said index rings. If, however, the push button n is depressed, the shaft m is projected toward the index rings, and its rigid toothed wheels y engage the gear teeth x of the index rings, and if the milled handle knob on the end of the shaft m be turned, it will be seen that the index rings are each turned by its corresponding adjusting wheel y, so as to restore the index rings to the zero position. Inasmuch, however, as the index rings will occupy different positions, and it is necessary to stop them at different points, the blank space b s in the teeth x are all arranged in a definite relation to the zero indication of the index ring, so that whenever the zero mark is brought opposite the window, the adjusting wheel y of that index ring will revolve freely in said blank space and turn said index ring no farther, while the other adjusting wheels y will continue to turn their respective index rings until they each in turn are also brought to the zero point, when the blank spaces will then be under all the adjusting wheels.

To cover and protect the slots t, in the eccentric portions of the housing, against the entrance of dust and dirt, the shaft m is provided with a dust cap p, as seen in Fig. 6.

The foregoing construction as heretofore outlined may be readily converted into what may be known as a logometer or word counter, and is designed to be used on any or all makes of typewriters, type setting machines, or other machines where it is necessary to count the words or lines, counting them automatically as they may be written, counting them accurately and without a single extra stroke on the space bar or any other key of the machine, and without a moment's time lost from the operation, so that the speed of the operator is not in any degree interfered with. In the drawings, Figs. 7 and 8, we have shown our logometer as applied to the Oliver or Smith Premier typewriters, but with very slight changes it may be applied to any other make of machine. In Fig. 9 it is shown applied as an external attachment to the machine, in which a separate clamp plate P² fastens it to the machine. In Fig. 8 it is shown incorporated in the body of the machine itself, whose framework is provided with a window W² through which the index rings show their markings, and in which the adjusting shaft for restoring the index rings to zero is extended out to one side of the machine as shown at m². In all cases, however, it is preferably attached at the right hand side of the machine.

Every user of the typewriter knows that between every word written the space bar is operated, and our logometer is constructed so as to use the operation of the space bar for the operation of the logometer, so that for every time the space bar is pressed down to space the words as they are written, the logometer registers 1. Of course it frequently occurs that the space bar is used to make longer spaces than are used between simple words in ordinary writing, but when this is desired, the logometer is so constructed as to be instantaneously thrown out of gear by reason of the character of the connection between the space bar and the logometer proper, this being done so quickly and so easily that when its use has been practiced and even slightly accustomed to, it will not under any circumstances afford any appreciable decrease in the speed of the operator to separate the connection between the space bar and the logometer. This logometer or word counter is constructed on the same theory and principles as are set forth hereinbefore when used as a cyclometer, and has substantially the same general appearance. We prefer, however, to make the following slight modifications for actuating the index rings. Instead of employing the cams 12 and 13, and the differential gears 4 and 5, as in Fig. 1, we simply attach to the main shaft B—see Fig. 3—an arm r, which arm is extended over so as to engage the teeth of the first index ring of the series, and the movement is thereby transmitted from the actuating shaft B directly to the first index ring without the differential gear, and which movement is transmitted from the first index ring to the second index ring, and thence to the third, and so on, by the system of carrying shown in Fig. 1, or by any other system of carrying.

The character of the connection between the space bar of the machine and the logometer proper, may be varied to a considerable extent, as the case demands, but for the present purposes, we illustrate the means shown in Fig. 7, for the reason that it is both accurate and adjustable. We attach a ratchet wheel A to one end of the actuating shaft B, which ratchet wheel contains 10 teeth and movement is transmitted to this main ratchet wheel A by a depressible plunger rod C, which passes through and is held in position by the cylinder D. Near the lower end of the rod C a finger G passes through the same and engages the teeth in the ratchet wheel A, being forced in the proper position to engage the teeth by the spring F. A coil spring E arranged in the cylinder is for the purpose of returning the rod C in upward direction after each down stroke. A rod H telescopes into the rod C, being fastened thereto with a thumb screw O. The purpose of making this rod with this extensible section, is to regulate the same to the length of stroke of different space bars, or the height of different space bars. There is fastened on the space bar M of the typewriter a grooved guide P in the upper side of which is arranged a slide K turned up slightly at both ends, which slide may be instantly brought forward or pushed backward by a movement of the finger, and when in forward position, will when the space bar is operated, press the bent end of the rod section H downward, thereby transmitting the movement through the plunger rod C to the ratchet wheel A. When the slide K is pushed backward, out of range of engagement with the bent end of rod H, in such position the space bar operates without registering on the counter. A rigid base or offsetting projection R is formed on the end of the casing of the logometer, which supports the cylinder D, and a suitable stop projection for limiting the downward movement of the plunger rod C is provided to prevent the ratchet wheel A from being turned too far and carrying the index ring past the proper point. This will insure the index ring being turned exactly the same distance at each stroke. The ratchet wheel A, rod C, and lower end of the cylinder D, will all be preferably inclosed in the main casing of the logometer, and will not be visible.

We claim:

1. In a counter of the kinds described, the combination with actuating gears and a peripheral index ring, of a loosely swiveled actuating toothed ring arranged inside of the index ring, and connected to the actuating gears, and means for coupling said loose toothed ring and the index ring rigidly together for revolution in one direction, and permitting independent movement in the opposite direction.

2. In a counter of the kinds described, the combination with a peripheral index ring having internal ratchet teeth, and an independently movable toothed ring loosely turning inside of the index ring and having a spring pawl adapted to engage the ratchet teeth of the index ring.

3. In a counter of the kinds described, the combination of a series of index rings, having teeth along their sides, a setting shaft arranged parallel to the axis of the index rings and bearing rigid adjusting wheels arranged in the plane of the teeth of the index rings, a bail having bearings supporting said shaft, an inclosing casing having an eccentric projection inclosing said bail and adjusting wheels, said eccentric casing being formed with slots through which the setting shaft passes, a push button attached to the bail carrying said shaft, and arranged on the outside of the casing, and a spring for withdrawing the shaft and the setting wheels from the index rings.

4. In a counter of the kinds described, the combination of a series of index rings having teeth along their sides, a setting shaft arranged parallel to the axis of the index rings and bearing rigid adjusting wheels arranged in the plane of the teeth of the index rings, a bail having bearings supporting said shaft, an inclosing casing having an eccentric projection inclosing said bail and adjusting wheels, said eccentric casing being formed with slots through which the setting shaft passes, a push button attached to the bail carrying said shaft, and arranged on the outside of the casing, a spring for withdrawing the shaft and the setting wheels from the index rings, and a dust cap arranged on the end of the setting shaft and covering the slot in the eccentric portion of the casing.

5. The combination of a counter, the space bar of a typewriter, and intervening mechanism for operating the counter by the depression of the space bar, said mechanism consisting of a toothed wheel on the shaft of the counter, a reciprocating plunger, a spring for elevating the same, and a tappet projection attached to the space bar of the typewriter.

6. The combination of a counter, the space bar of a typewriter, and intervening mechanism for operating the counter by the depression of the space bar, said means consisting of a toothed wheel on the counter shaft, a reciprocating plunger engaging therewith, a spring for raising said plunger, an adjustable extension for said plunger, and a tappet projection arranged on the space bar of the type-writer.

7. The combination of a counter, the space bar of a typewriter, and intervening mechanism for operating the counter by the depression of the space bar, said means consisting of a toothed wheel on the counter shaft, a reciprocating plunger engaging therewith, a spring for raising said plunger, an adjustable extension for said plunger, and a tappet projection arranged on the space bar of the typewriter, said tappet projection being made adjustable into or out of engagement with the plunger bar.

ROBERT W. VARDEMAN.
CLARENCE B. VARDEMAN.

Witnesses:
J. W. BARNHILL,
R. T. BRIGHTWELL.